(12) United States Patent
Molini

(10) Patent No.: US 9,208,186 B2
(45) Date of Patent: Dec. 8, 2015

(54) INDEXING TECHNIQUE TO DEAL WITH DATA SKEW

(75) Inventor: Stephen Molini, Omaha, NE (US)

(73) Assignee: Teradata US, Inc., Dayton, OH (US)

( * ) Notice: Subject to any disclaimer, the term of this patent is extended or adjusted under 35 U.S.C. 154(b) by 2220 days.

(21) Appl. No.: 12/055,398

(22) Filed: Mar. 26, 2008

(65) Prior Publication Data

US 2009/0248616 A1 Oct. 1, 2009

(51) Int. Cl.
*G06F 17/30* (2006.01)

(52) U.S. Cl.
CPC .... *G06F 17/30336* (2013.01); *G06F 17/30097* (2013.01); *G06F 17/30498* (2013.01)

(58) Field of Classification Search
CPC ............................................... G06F 17/30097
USPC ...................... 707/3, 5, 7, 714, 968
See application file for complete search history.

(56) References Cited

U.S. PATENT DOCUMENTS

| | | | | |
|---|---|---|---|---|
| 5,241,648 A | * | 8/1993 | Cheng et al. ..................... | 707/7 |
| 5,542,073 A | * | 7/1996 | Schiefer et al. .................. | 707/2 |
| 5,802,357 A | * | 9/1998 | Li et al. ............................. | 707/1 |
| 2005/0283460 A1 | * | 12/2005 | Chen .................................. | 707/1 |
| 2009/0193006 A1 | * | 7/2009 | Herrnstadt ........................ | 707/5 |

OTHER PUBLICATIONS

"Managing Clusters", Published 2006; referred to hereinafter as 'Oracle' http://docs.oracle.com/cd/B19306_01/server.102/b14231/clustrs.htm.*

* cited by examiner

*Primary Examiner* — Apu Mofiz
*Assistant Examiner* — Chelcie Daye
(74) *Attorney, Agent, or Firm* — Randy L. Campbell, Jr.

(57) ABSTRACT

A method for facilitating join operations between a first database table and a second database table within a database system. The first database table and the second database table share at least one common index column. The method includes creating a new index column in the second database table that is populated with a limited number of distinct calculated values for the purpose of increasing the overall number of distinct values collectively assumed by the columns common between the two tables. An intermediate table is created, the intermediate table including the common columns of the first database table, the second database table, and the new index column. An index is defined of the intermediate table to be the column(s) common between the first and second tables. An index is defined of the second table to be the column(s) common between the first database table, the second database table and the new index column.

6 Claims, 5 Drawing Sheets

INDEXING TECHNIQUE TO DEAL WITH DATA SKEW

BACKGROUND

Computer systems generally include one or more processors interfaced to a temporary data-storage device such as a memory device and one or more persistent data-storage devices such as disk drives. Each disk drive generally has an associated disk controller. Data is transferred between the disk drives and the disk controllers. Data is also transferred between the disk controllers and the memory device over a communications bus or similar.

Data organization in a computer system such as that above is important in relational database systems that deal with complex queries against large volumes of data. Relational database systems allow data to be stored in tables that are organized as both a set of columns and a set of rows. Standard commands are used to define the columns and rows of tables and data is subsequently entered in accordance with the defined structure.

The defined table structure is locally maintained but may not correspond to the physical organization of the data. In a parallel shared nothing relational database data can be stored across multiple data-storage facilities, each data-storage facility in turn including one or more disk drives. Data partitioning can be performed in order to enhance parallel processing across multiple data-storage facilities.

Hash partitioning is a partitioning scheme in which a predetermined hash function and map is used to assign rows in a table to respective processing modules and data-storage facilities. The hashing function generates a hash bucket number and the hash numbers are mapped to data-storage facilities.

Natural data skew can be particularly troublesome for certain customer scenarios. It is important to have a primary index choice for a big table that fairly evenly distributes the rows across the processing modules. It is also important to ensure that there are efficient joins to other tables in a data warehouse implemented on the above system.

SUMMARY

Described below is a method for facilitating join operations between a first database table and a second database table within a database system. The first database table and the second database table share at least one common index column. The method includes creating a new index column in the second database table that is populated with a limited number of distinct calculated values for the purpose of increasing the overall number of distinct values collectively assumed by the columns common between the two tables. An intermediate table is created, the intermediate table including the common columns of the first database table, the second database table, and the new index column. An index is defined of the intermediate table to be the column(s) common between the first and second tables. An index is defined of the second table to be the column(s) common between the first database table, the second database table and the new index column.

Also described below is a method of indexing a database table within a distributed database system. The system comprises a plurality of processing nodes and data storage facilities. The method includes creating an index structure mapping specific key values to a list of logical row id pointers to individual rows. Operations to the index structure are dynamically determined during insert, update, and delete operations when a threshold for the number of multiple row id pointers corresponding to a single index key value has or has not been exceeded. A logical pointer is computed that identifies both the processing node and storage facility containing the row being indexed but only an approximate range of storage blocks that potentially may contain the row. The index structure is consolidated by only storing a single vague row id pointer for the corresponding rows where the associated skew threshold has been exceeded and a specific row id pointer otherwise.

DETAILED DESCRIPTION OF DRAWINGS

Figure 1:
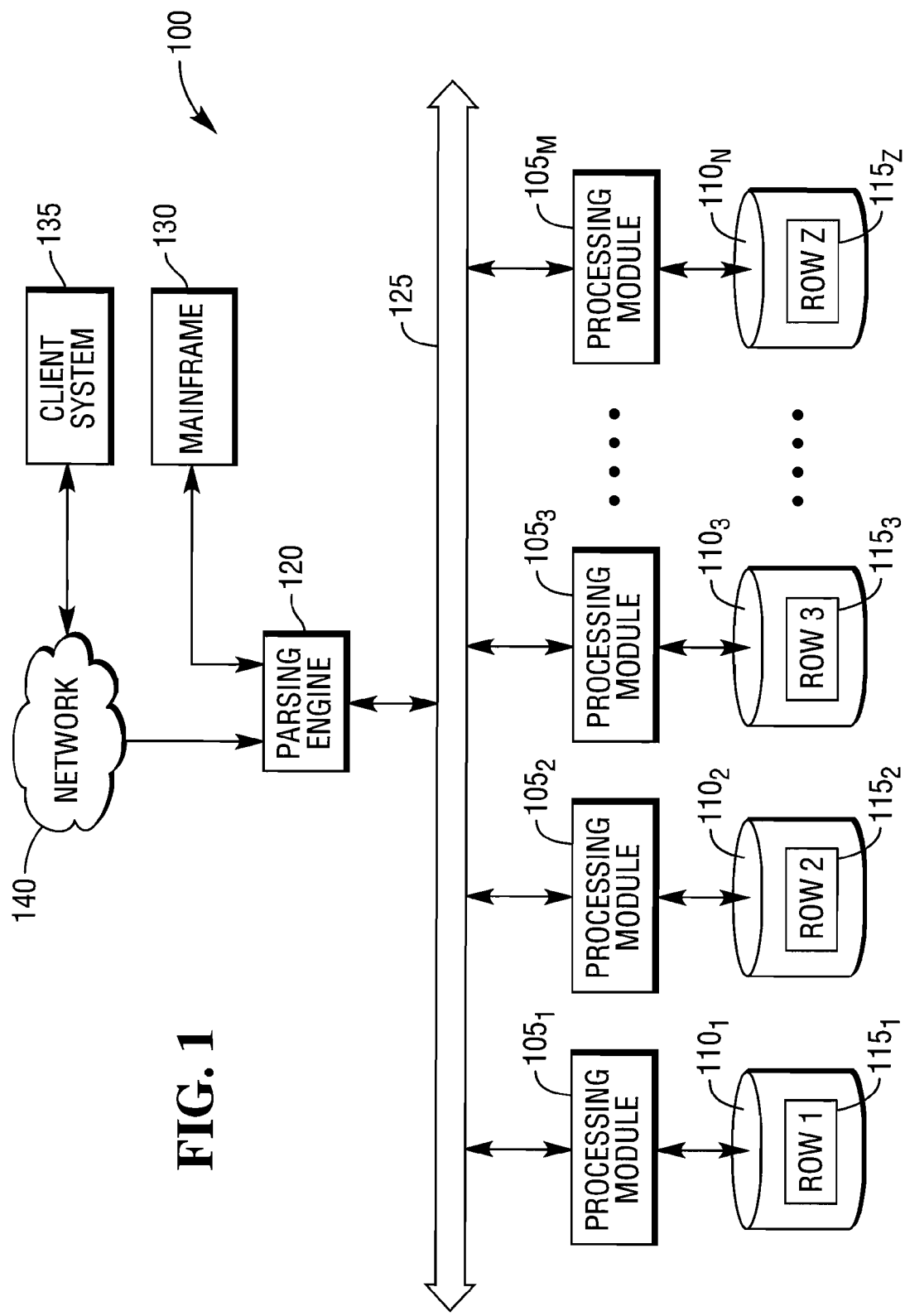
FIG. 1 is a block diagram of an exemplary large computer system in which the techniques described below are implemented.

FIG. 1 shows an example of a database system 100, such as a Teradata Active Data Warehousing System available from Teradata Corporation. Database system 100 is an example of one type of computer system in which the indexing techniques are implemented. In computer system 100, vast amounts of data are stored on many disk-storage facilities that are managed by many processing units. In this example, the data warehouse 100 includes a relational database management system (RDMS) built upon a massively parallel processing (MPP) platform.

The data warehouse 100 includes one or more processing modules $105_{1 \ldots M}$ that manage the storage and retrieval of data in data-storage facilities $110_{1 \ldots N}$. Each of the processing modules $105_{1 \ldots M}$ manages a portion of a database that is stored in a corresponding one of the data-storage facilities $110_{1 \ldots N}$. Each of the data-storage facilities $110_{1 \ldots N}$ includes one or more disk drives.

The system stores data in one or more tables in the data-storage facilities $110_{1 \ldots N}$. The rows $151_{1 \ldots Z}$ of the tables are stored across multiple data-storage facilities $110_{1 \ldots N}$ to ensure that the system workload is distributed evenly across the processing modules $105_{1 \ldots N}$. A parsing engine 120 organizes the storage of data and the distribution of table rows $115_{1 \ldots Z}$ among the processing modules $105_{1 \ldots N}$. The parsing engine 120 also coordinates the retrieval of data from the data-storage facilities $110_{1 \ldots N}$ over network 125 in response to queries received from a user at a mainframe 130 or a client computer 135 connected to a network 140. The database system 100 usually receives queries and commands to build tables in a standard format, such as SQL.

Figure 2:
FIG. 2 shows an example database schema that illustrates the challenges associated with natural data skew.

FIG. 2 shows an example database schema stored in data warehouse 100. The schema is suitable for a mobile telephone carrier that wants to augment a data warehouse with call detail records (cdrs). The database schema 200 includes a subscriber table 210 and a cdr_table 250.

The primary key of the subscriber table 210 is subscriber_id 215 and other descriptive fields such as subscriber_name 220 are stored in the subscriber table 210 but not in the cdr_table 250.

The primary key columns for the cdr_table 250 includes a subscriber_id field 255 but additional fields such as call_date 260 and call_time 265 that are not stored in the subscriber table 210. The cdr_table 250 includes further descriptive fields for example a number_called field 270.

In a practical application of database schema 200 it is not unusual for the main cdr_table 250 to consist of billions of records tracking each individual call placed on the carrier's network. The most useful analysis of data requires a join to other tables, for example subscriber table 210, and it is usually most efficient if the database administrator defines the primary index for the cdr_table 250 to be a non-unique primary index matching the table one would most likely join to. In this case, that would mean defining the primary index of the cdr_table 250 to be just the single column subscriber_id 255.

Unfortunately, however, natural data skew can result in tens of thousands if not millions of rows in the cdr_table 250 all corresponding to a single subscriber_id key. In this situation it is difficult to store the table efficiently within a Teradata system without sacrificing join performance available to joins within a single processing module 105.

Figure 3:
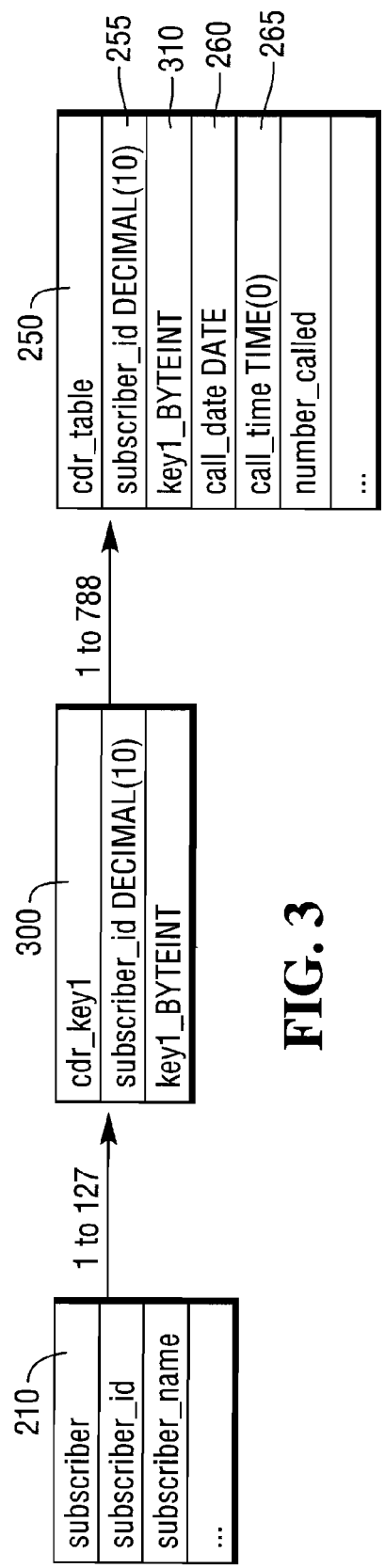
FIG. 3 shows a database design technique for mitigating the effects of data skew on the example schema shown in FIG. 2.

FIG. 3 shows a technique for defining an intermediate cdr_key1 table 300 that bridges the join between the subscriber table 210 and the cdr_table 250. A new key1 field 310 is added to the cdr_table 250 that is computed to be an integer value by deterministically hashing the other primary key columns such as call_date 260 and call_time 265 with the Teradata HASHROW and HASHBUCKET functions and then applying a modulo N function to the result.

The N value used for modulo N is user-configurable but the value 127 is illustrated in the following example equation:

$$key1 = HASHBUCKET(HASHROW(call\_date, call\_time)) MOD\ 127$$

By defining the primary index of this cdr_table 250 to be the composite key of subscriber_id 255 and key1 310 and then loading the cdr_key1 table 300 with the distinct keys from cdr_table 250 we get the best of both worlds. The primary index distribution of cdr_table table 250 is tolerable because the number of distinct values stored in the primary index has increased. The primary index distribution of the cdr_key1 bridge table 300 is tolerable because the MOD N function has limited the number of distinct key values per subscriber_id.

The hashing equation 320 is deterministic and randomizes distinct key values. Hot spots that might normally be caused by simplistic MOD N functions alone. The need is avoided to correlate input data records with the assigned key1 values 310.

One example is where a particular loading process is aborted in the middle and has to be re-started. Since the HASHBUCKET(HASHROW(J1, J2, ..., Jn)) MOD N function is deterministic, records that were loaded after the restart will get assigned the same key1 value as they would have been before the restart even though no lists were maintained to track which (call_date, call_time) values mapped to which key1 values.

Figure 4:
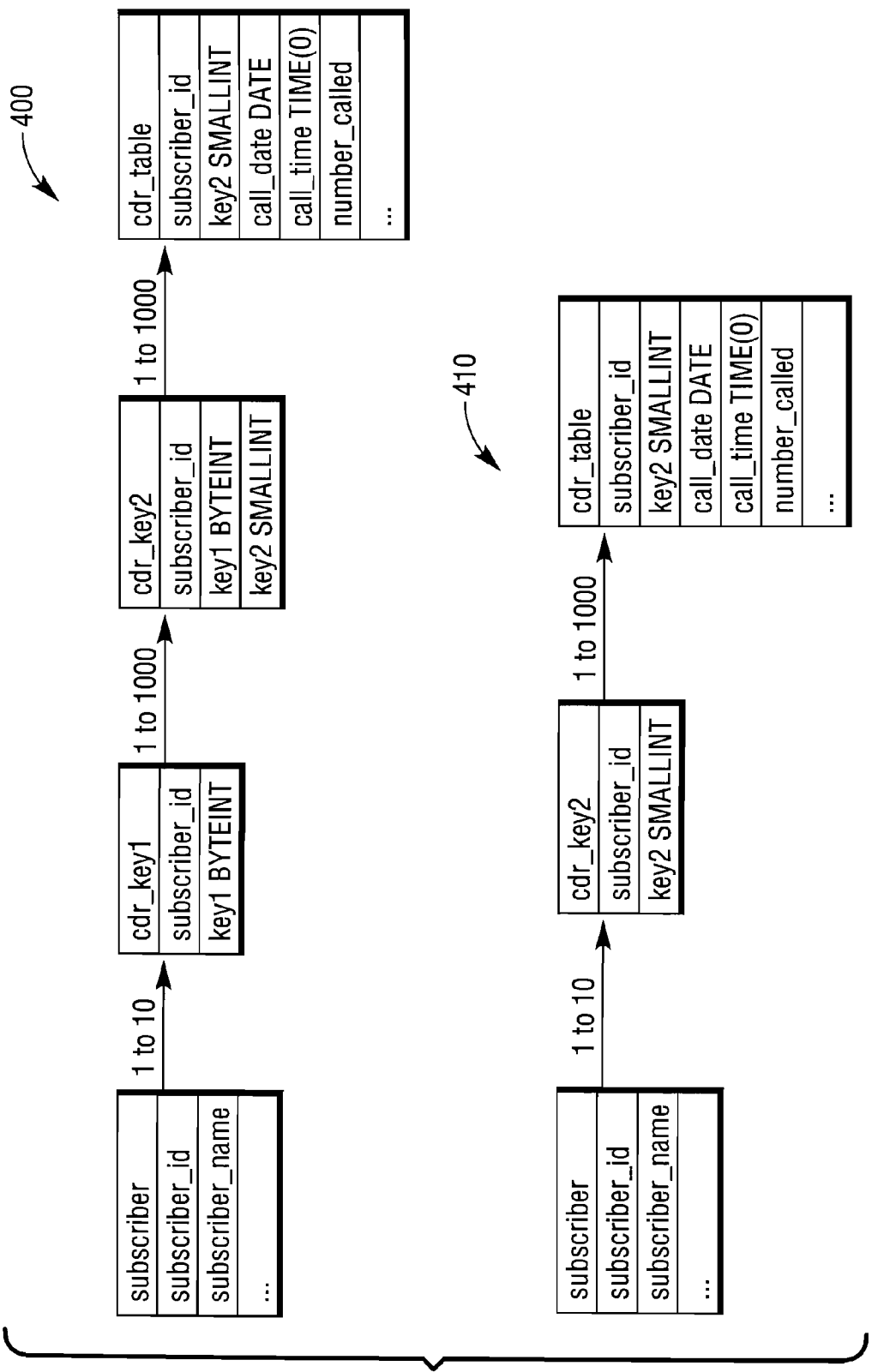
FIG. 4 shows variations of the technique illustrated in FIG. 3.

FIG. 4 shows two different variations of the same technique that deal with the fact that natural data skew can occur to varying degrees in the real world. Diagram 400 illustrates how one could construct multiple intermediate tables to progressively bridge the join from the subscriber and cdr_table tables. Diagram 410 illustrates how one might employ application-specific logic to leverage different formulas for computing the key1 values. Depending upon the situation, these other design variations might be appropriate for optimizing overall performance of the solution.

The examples illustrated so far are all solutions that any customer or consultant could implement provided that they understood the method and could employ a black-box function for computing the new key1 values used for distributing the skew. The difficulty, however, is that applications need to be aware of the intermediate bridge table(s) and load processes need to be tied down to a specific algorithm for computing the key1 values.

A more elegant approach would be to let the database administrator create an index structure that can quickly find rows in the cdr_table 250 even though the primary index covers more than just the subscriber_id field 255. One can do something like that today with the CREATE JOIN INDEX or CREATE HASH INDEX syntax but those mechanisms create an index structure that has a distinct row-id per row in the cdr_table 250. If there are literally tens of thousands if not millions of cdr_table rows for certain subscriber_id key values then the join index or hash index data structure suffers from the same skewing issue as the base table.

Figure 5:
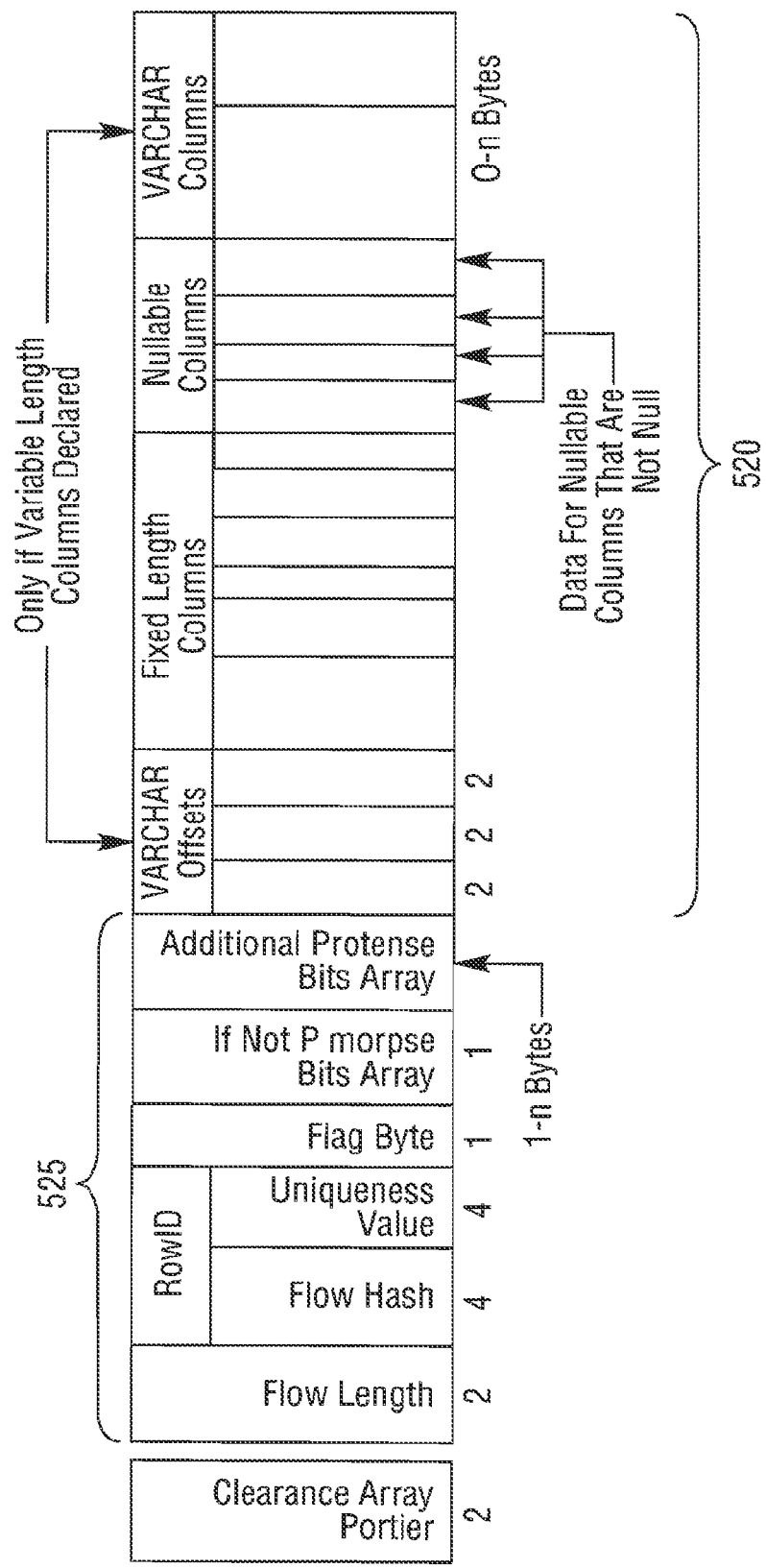
FIG. 5 shows the generic layout of a hash index or join index record as stored in the Teradata database.

FIG. 5 shows a row structure for one type of join index or hash index in the Teradata database. It is assumed for simplicity that we are using 32-bit addressing and that the database administrator issued something like the following statement to create a hash index on the cdr_table 250. What is significant about this hash index is that it creates an index structure that is stored in the Teradata file system on the subscriber_id column but each index structure row contains row-id pointers to the base table rows in cdr_table 250.

All of the discussion applies equally well to certain types of join indexes as they do to hash indexes as well as to 64-bit addressing with appropriate allowances for differing byte alignments and low-level row formats.

CREATE HASH INDEX cdr_key3 (subscriber_id) ON cdr_table BY (subscriber_id);

Once the above hash index is created, a single record in the hash index structure consists of a fixed part that stores the actual subscriber_id value and a repeating part that consists of a sequence of row identifiers. Although FIG. 5 does not explicitly show this, the fixed part and repeating part structures are stored in region 520 of the row whereas the row header is region 525. In the example that we are following, region 520 will contain a single subscriber_id value along with a list of row-id pointers to the base table rows in cdr_table 250. The only commonality associated with the list of row-id pointers in the fixed part is that they are all point to rows in the Teradata file system that all have the same subscriber_id indicated by the value stored in the fixed part.

Figure 6:
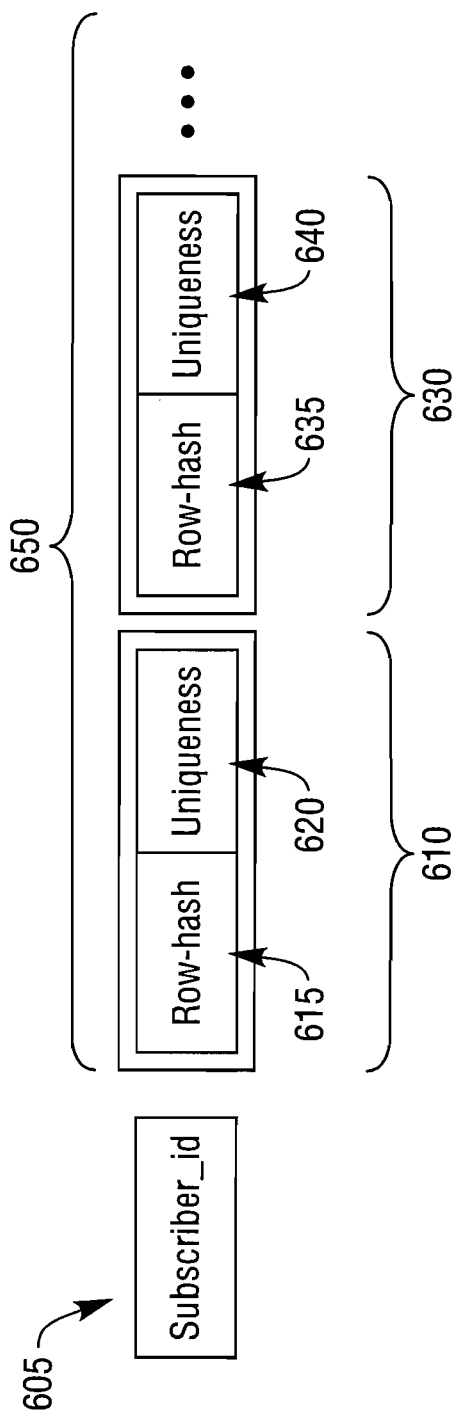
FIG. 6 shows how base table row-id pointers are stored in a generic hash index or join index structure.

FIG. 6 shows how region 520 is conceptually structured. A single record of a hash index structure consists of the actual subscriber_id 605 followed by a number of row-id pointers to the base table rows 650. Each row-id pointer (610 and 630) consists of a 4-byte row hash value (respectively, 615 and 635) and a 4-byte uniqueness value (respectively, 620 and 640). If the subscriber_id in question is associated with 100 base table rows in the cdr_table 250 then there will be 100 such row-id pointers in a single index row. If there are one thousand such underlying rows the hash index structure does allow for overflow index rows but the particular point of concern when excessive data skew is present is that literally tens of thousands if not millions of such row-id pointers will have to reside in the hash index structure for certain subscriber_id values.

A typical row identifier might have the hexadecimal value 02A4 C245 for the row hash 615 and 0000 0001 for the row uniqueness portion 620. Our proposed solution is that in the presence of data skew we will store a "vague" row identifier that identifies a scan range within the Teradata File System to find the associated rows instead of storing a distinct row-id for every single base table row in the cdr_table 250 table with the relevant subscriber_id key. A range flag is defined that distinguishes a vague row identifier from a conventional row identifier. One example of a range flag is a uniqueness value that is unlikely to occur normally. One example is the value FFFF FFFF for a uniqueness value and the scan range might be to only scan those File System blocks surrounding row hash 02A4 C245. This would be represented with the vague row-id of 02A4 C200, FFFF FFFF.

Whenever the hash index structure is updated to add a new row-id pointer, the system checks to see if long lists of multiple row identifiers can be consolidated together into a single vague row-id. If a vague row-id already exists in the hash index structure and the new row-id to be added fits within it's scope then no change is needed to the hash index structure.

The number of pointer keys that have to be stored in the hash index structure is reduced at the cost of slightly increased scan time to find actual rows in an underlying base table.

Inserts into the index structure can be effected by upsert checking. The deletion of rows is slightly more complicated. An extra check is required to validate if other keys within the same row identifier range still exist in the cdr_table after deleting a particular row. It is envisaged that a garbage-collection technique could forego the additional check on individual delete statements in favour of a periodic batch process to revalidate the index structure.

It is also envisaged that a special syntax is defined on the create hash index statement to more specifically define this case. The following restrict primary phrase instead of the column_1 list could be used with the restriction that the by column_2 list is a proper subset of the primary index columns.

CREATE HASH INDEX cdr_key3 RESTRICT PRIMARY ON cdr_table BY (subscriber_id).

The text above describes one or more specific embodiments of a broader invention. The invention also is carried out in a variety of alternative embodiments and thus is not limited to those described here. Those other embodiments are also within the scope of the following claims.

The invention claimed is:

1. A method for facilitating join operations between a first database table and a second database table within a database system, the first database table and the second database table sharing at least one common index column, the method comprising:
   creating a new index column in the second database table that is populated with a limited number of distinct calculated values for the purpose of increasing the overall number of distinct values collectively assumed by the columns common between the two tables;
   creating an intermediate table, the intermediate table including the common columns of the first database table, the second database table, and the new index column;
   defining an index of the intermediate table to be the column(s) common between the first and second tables; and
   defining an index of the second table to be the column(s) common between the first database table, the second database table and the new index column.

2. The method of claim 1 further comprising defining one or more additional intermediate tables between the first database table and the second database table with multiple calculated index columns, the additional intermediate tables progressively augmenting the number of distinct index key values when advancing joins from one intermediate table to the next until finally reaching the second database table.

3. The method of claim 1 further comprising a developer-controlled or administrator-controlled extension to the function used to calculate values for the new index column specifically as where those extensions alter the range of distinct values that can be generated.

4. Non-transitory computer readable media on which is stored computer executable instructions that when executed on a computing device cause the computing device to perform a method for facilitating join operations between a first database table and a second database table within a database system, the first database table and the second database table sharing at least one common index column, the method comprising:
   creating a new index column in the second database table that is populated with a limited number of distinct calculated values for the purpose of increasing the overall number of distinct values collectively assumed by the columns common between the two tables;
   creating an intermediate table, the intermediate table including the common columns of the first database table, the second database table, and the new index column;
   defining an index of the intermediate table to be the column(s) common between the first and second tables; and
   defining an index of the second table to be the column(s) common between the first database table, the second database table and the new index column.

5. The non-transitory computer readable media of claim 4 wherein the method further comprises defining one or more additional intermediate tables between the first database table and the second database table with multiple calculated index columns, the additional intermediate tables progressively augmenting the number of distinct index key values when advancing joins from one intermediate table to the next until finally reaching the second database table.

6. The non-transitory computer readable media of claim 4 wherein the method further comprises a developer-controlled or administrator-controlled extension to the function used to calculate values for the new index column specifically as where those extensions alter the range of distinct values that can be generated.

* * * * *